United States Patent
McNelly

(10) Patent No.: US 6,281,001 B1
(45) Date of Patent: Aug. 28, 2001

(54) PROCESS FOR CONTROLLED COMPOSTING OF ORGANIC MATERIAL AND FOR BIOREMEDIATING SOILS

(76) Inventor: James J. McNelly, 1034 Bromo Ave., St. Cloud, MN (US) 56303

( * ) Notice: Subject to any disclaimer, the term of this patent is extended or adjusted under 35 U.S.C. 154(b) by 0 days.

(21) Appl. No.: 09/184,501

(22) Filed: Nov. 2, 1998

Related U.S. Application Data

(63) Continuation-in-part of application No. 08/556,503, filed on Nov. 13, 1995, now abandoned.

(51) Int. Cl.$^7$ ................................. C02F 3/02; C05F 11/08
(52) U.S. Cl. ..................... 435/262; 71/8; 71/9; 71/903; 210/612; 210/613; 210/620; 435/262.5; 435/290.1
(58) Field of Search ................ 71/8, 9, 903; 435/262, 435/262.5, 290.1; 210/620, 612, 613

(56) References Cited

U.S. PATENT DOCUMENTS

| | | |
|---|---|---|
| 1,980,244 | 11/1934 | Wright . |
| 2,734,803 | 2/1956 | Ruskin . |
| 3,357,812 | 12/1967 | Snell . |
| 3,916,987 | 11/1975 | Giansante . |
| 4,046,689 | 9/1977 | Argyll . |
| 4,139,640 | 2/1979 | Kipp, Jr. . |
| 4,161,426 | 7/1979 | Kneer . |
| 4,255,389 | 3/1981 | Jung et al. . |
| 4,272,489 | 6/1981 | Lutz et al. . |
| 4,274,838 | 6/1981 | Dale et al. . |
| 4,326,874 | 4/1982 | Bürklin . |
| 4,339,265 | 7/1982 | Engelmann . |
| 4,374,804 | 2/1983 | Easter, II . |
| 4,384,877 | 5/1983 | Nemetz . |
| 4,411,682 | 10/1983 | Brill . |
| 4,414,335 | 11/1983 | Kipp, Jr. . |
| 4,426,020 | 1/1984 | Presseau et al. . |
| 4,436,817 | 3/1984 | Nemetz . |
| 4,483,704 | 11/1984 | Easter, II . |
| 4,659,472 | 4/1987 | Nordlund et al. . |
| 4,662,900 | 5/1987 | Ottengraf . |
| 4,798,802 | 6/1989 | Ryan . |
| 4,869,877 | 9/1989 | Sellew et al. . |
| 4,946,108 | 8/1990 | König et al. . |
| 4,956,002 | 9/1990 | Egarian . |
| 4,994,245 | 2/1991 | Murray et al. . |
| 5,023,178 | 6/1991 | Schiene et al. . |
| 5,028,197 | 7/1991 | Krein et al. . |
| 5,049,486 | 9/1991 | Blackwood et al. . |
| 5,071,622 | 12/1991 | Dunson, Jr. . |
| 5,080,786 | 1/1992 | De Lima . |
| 5,102,803 | 4/1992 | Weaver . |
| 5,137,687 | 8/1992 | Dunson, Jr. . |
| 5,160,707 | 11/1992 | Murray et al. . |
| 5,175,106 | 12/1992 | Laurenson, Jr. . |

(List continued on next page.)

FOREIGN PATENT DOCUMENTS 679 644 A5    3/1992   (CH) .

Primary Examiner—Wayne Langel
(74) Attorney, Agent, or Firm—Albert W. Watkins

(57) ABSTRACT

The invention includes a method and apparatus for composting organic material and maintaining composting conditions within preselected limits. Composting according to the method can occur within a sealable container. Adjusting the composition of the organic material to within preselected limits converts the organic material to a compostable mixture. The composition is adjusted by amending the organic material and by mixing the amended organic material with a bulking agent and an inoculant. Incubating forms a composting mixture from the compostable mixture. The method includes the steps of monitoring and adjusting conditions of the composting mixture to maintain the conditions within preselected limits. The conditions of the composting mixture are adjusted by aerating the composting mixture or remixing the composting mixture. The remixed composting mixture is incubated to yield composted organic material.

17 Claims, 4 Drawing Sheets

U.S. PATENT DOCUMENTS

| | | |
|---|---|---|
| 5,190,572 | 3/1993 | Long . |
| 5,206,173 | 4/1993 | Finn . |
| 5,248,612 | 9/1993 | Johnson . |
| 5,275,733 | 1/1994 | Burnham . |
| 5,312,754 | 5/1994 | Bryan-Brown . |
| 5,354,349 | 10/1994 | Inoue . |
| 5,387,036 | 2/1995 | Hagen et al. . |
| 5,395,417 | 3/1995 | Thomas . |
| 5,407,809 | 4/1995 | Finn . |
| 5,409,831 | 4/1995 | Wright . |
| 5,417,736 | 5/1995 | Meyer . |
| 5,417,861 | 5/1995 | Burnham . |
| 5,534,437 | 7/1996 | Arrau . |
| 5,551,969 | 9/1996 | Wright . |
| 5,567,220 | 10/1996 | Thorpe et al. . |
| 5,584,904 | 12/1996 | Dalos . |
| 6,117,671 * | 9/2000 | Yilmaz ................................ 435/262 |

* cited by examiner

PROCESS FOR CONTROLLED COMPOSTING OF ORGANIC MATERIAL AND FOR BIOREMEDIATING SOILS

CROSS REFERENCE TO RELATED APPLICATION

The present application is a continuation in part of U.S. patent application Ser. No. 08/556,503 filed on Nov. 13, 1995 now adandoned.

TECHNICAL FIELD

This invention relates to a method and apparatus for composting organic material and maintaining composting conditions within preselected ranges.

BACKGROUND OF THE INVENTION

Landfill space is dwindling, industrial and municipal waste production is increasing, and the disposal of solids from waste water treatment is becoming more complex. Composting is a viable alternative for disposal of organic materials from nearly all waste streams. Composting can be used to process municipal waste water biosolids, to remediate industrial waste water biosolids, and to treat wastes from processing food and agricultural products. Composting can reduce the volume of organic waste materials by about 50% or more while producing a stable non-odorous material that can be used as fertilizer or an amendment for soil.

Before about 1970, composting was a simple process in which waste materials were piled and allowed to sit until they decomposed. It was typically done on a small scale and was not considered for industrial-scale problems. Initially, industrial-scale composting was viewed as a means to reduce the volume of a waste stream. Material was shredded to small bits and then composted to be reduced into even smaller particles. Grinding the material to be composted was considered advanced technology.

The next advance in composting technology came from the realization that the efficiency of composting could be increased by adding air to the composting mixture. The microbes that produce compost require air and will smother inside of a static unaerated pile. Hence, the initial methods of aeration involved moving the compost to allow air into the stack.

A typical example of this aeration is a windrow turner that picks up the compost and dumps it to one side. Process control was quite primitive. Approximately 95% of municipal composting sites are currently windrow turner operations. Piles were typically turned at the convenience of the operator, rather than to optimize the composting process. A typical pile of compost will use all of its oxygen within about ½ hour, so such windrow turning was seldom related to actual oxygen demand. Turning was done seldom enough that the microbes in the center of the pile were rapidly depleted and the center of the pile was no longer composting. Turning the pile merely reinoculated the material from the center with fresh microbes and composting continued in the center of the pile for another ½ hour when the oxygen supply was depleted.

In addition, composting with windrow turners was typically done in an open unsheltered area. The vagaries of the weather and rainfall most often determined the water content of the composting mass. When there was too little rain, the pile was often too dry. When there was too much rain, the pile was wet and required frequent turning. Too much rain could also lead to problems with runoff of leachate.

One method used to overcome some of the disadvantages of pile composting is to enclose the piles in a building. A roof can keep rain off of the compost and allow better regulation of water content. However, such a facility is very expensive. Furthermore, it involves managing the quality of large volumes of air within the building. Operators must enter the structure where the atmosphere can be irritating, if not toxic, to maintain the composting process.

Some of the disadvantages of pile composting are overcome by in-vessel processes. Such processes enclose the compost in a reactor vessel. They can also mechanize materials handling and mixing of the organic materials to be composted. Vessel systems to date have typically been complicated systems which require precision construction techniques and permanent, stable foundations. Organic waste is typically fed into an opening at one end of the reactor and compost is removed from the other end. The material is moved through the reactor either by a complex moving floor apparatus or by an hydraulic ram. Aeration can be provided by pressurized air forced through the organic waste by air vents located throughout the moving apparatus. In-vessel reactors at least provide potential for collection of odorous emissions. The compost process can be enclosed and the air routed through a filtration system.

Some in-vessel systems also include mixing systems, typically rotating paddles or prongs, within the compost mass. Other in-vessel systems are static. The agitation systems used in in-vessel systems are expensive, prone to wear and failure, and provide agitation only at fixed intervals in the composting process.

U.S. Pat. No. 5,407,809 discloses an in-vessel system including a rotatable digester drum. The system includes an apparatus to rotate the drum. The drum has ribs and baffles that slow the flow of the organic material through the inclined drum and mix it as it progresses through the drum. All of the waste material progresses through the drum at the same rate. Air can be circulated through the drum to control the temperature of the composting mixture. Process control in this method includes the controlled rate of progression of the organic material through the drum and air circulation.

U.S. Pat. No. 5,312,754 discloses a container for composting that contains an inflatable bladder at the bottom of the container. At the start of the composting process, material is added to the container leaving enough empty space to allow inflation of the bladder. Inflation of the bladder lifts and then deflation lowers the compost to provide some mixing of the composting material. The system is portable and will work in commercial containers. Air circulation controls the temperature in the reactor and exhaust air is filtered to diminish odorous emissions. Process control includes mixing the original organic material by inflating the bladder and air circulation through the material.

U.S. Pat. No. 5,409,831 discloses a tunnel composting apparatus with a moving floor and mixing. Each of 14 trays are loaded at one end of the composter with up to 200 pounds of compost. A ram pushes the row of 14 trays along the floor of the composter. Aeration occurs in the tunnel middle, and there are two mixing stations in the center of the composter as well. Typically each tray takes 14 days to progress through the composter. This apparatus controls the composting process by mixing and aerating each tray of compost.

U.S. Pat. No. 4,798,802 discloses another moving floor in-vessel composting apparatus. This apparatus is a large, permanent installation in which compost is fed in one end of and moved through a two-level container. After the moving through the top level of the container, the compost is mixed and dropped into the lower level of the container, which is roughly a mirror image of the top level. The compost progresses through the second half of the container to the exit. Air is added to the compost through vents in the floor of the apparatus to allow temperature control. Process control includes possible feedback control of temperature and water levels, mixing half way through the process, and aeration.

U.S. Pat. No. 5,417,736 discloses an inexpensive, static, in-vessel composting system and a method for its use. A large plastic bag with a plurality of small vents is filled with compost and the bag is sealed. The organic material is pressed into the bag under pressure to eliminate shifting and to retain heat. The bag is penetrated by several ducts connected to an air supply. Air is forced through the ducts, into the compost, and out through the vents in the bag. As the air reaches the bag, moisture can condense on the bag resulting in retention of the condensate in the bag. The air flow can be used to control temperature.

U.S. Pat. No. 4,483,704 to Easter, II discloses a method for composting sludge by mixing the sludge with carbon material, layering the mixture in a silo and moving it through the silo on a timed interval basis. Aeration is possible in the silos. As additional composting sludge is acquired, it is further layered into the silo. The composting sludge is periodically withdrawn according to the timed interval basis and further layered in a second silo.

U.S. Pat. No. 5,190,572 to Long discloses a composting bin for residential use, the bin comprising stackable sub-units which can be assembled and disassembled. To use the bin, the sub-units are stacked to provide a first stacked bin, and biodegradable matter is placed into the bin to start the composting process. After substantial decomposition has occurred, the original top sub-unit is removed and placed on the ground to be the bottom sub-unit for a second stacked bin. The upper composting material is removed from the first bin and placed in the second bin. The next sub-unit is removed from the first bin and placed on the second bin, and more composting material from the first bin is placed in the second bin. This stacking procedure is continued until all the sub-units and composting material have been moved to the second bin. In this process of reversing the sub-unit stacking order, the compost is substantially mixed and aerated.

U.S. Pat. No. 5,354,349 to Inoue discloses a continuous method of producing compost by pulverizing the material and then carrying the material via conveyor belt through a treatment tank where it decomposes. The composted material can be returned to the process to be reprocessed, or can be mixed with unprocessed material and then processed. Inoue discloses an optimal moisture content in the mixture of 45–65 weight percent.

U.S. Pat. No. 4,339,265 to Engelmann discloses a method and apparatus for treating sewage including converting the solid sewage material into flat patties. The patties are stacked with wood chips as a bulking agent to serve as spacers and filler between the patties and the patties are allowed to decompose. The wood chips are separated from the decomposed material and can be reused as filler for the next patties.

U.S. Pat. No. 4,662,900 to Ottengraf discloses a method for removing malodorous and/or toxic components from gases by passing the gas stream through a filter bed. The filter bed consists of a mixture of an organic material, an inert fraction, and additives for neutralization and organic buffering. The entire bed, including the container, can be made of biodegradable materials.

There remains a need for an improved and economical in-vessel composting process in an industrial scale which is convenient, odorless, and not labor intensive.

SUMMARY OF THE INVENTION

The invention includes a method for composting organic material within a sealable container. Adjusting the composition of the organic material to within preselected limits converts the organic material to a compostable mixture. The composition is adjusted by amending the organic material and by mixing the amended organic material with a bulking agent and an inoculant. Incubating forms a composting mixture from the compostable mixture. The method includes the steps of monitoring and adjusting conditions of the composting mixture to maintain the conditions within preselected limits. The conditions of the composting mixture are adjusted by aerating the composting mixture and/or remixing the composting mixture. The remixed composting mixture is incubated to yield composted organic material.

Preferably, remixing includes transporting the composting mixture from the site at which it is incubated to a tipper and/or mixer at a site remote from the incubation site. The site remote, or mixing station, can be at some distance from the incubation site, preferably, about 10 yards to about 100 yards.

The invention also includes a system for composting organic material. The system comprises at least one sealable container for converting an organic material to a composted material, an air management apparatus for delivering air to the composting mixture, a control unit to measure the temperature of the composting mixture, and a biofilter for removing odors from the air and to prevent escape of noxious odors from the system. The sealable container is a dumpable container that can be filled with organic material, the material can be dumped from the container, and then the material can be returned to the sealable container. Also included in the system is a dumping system for removing the composting material from the sealable container. The system can optionally include at least one curing bin for storing the composting mixture after the composting process in a sealable container.

The system of the invention can be tailored to the individual needs and limitations of the site where the system is located. For example, a system for highly populated urban areas can comprise a sealable container that can hold approximately 1 cubic yard and a dumping system that is a small forklift. A mid-sized system can comprise a plurality of 40 cubic yard roll-off garbage containers and a tippable roll-off truck. A large system can comprise a plurality of 80 cubic yard intermodal containers located at a shipping port or railroad yard and a dumping system that comprises an overhead crane. The system includes an apparatus for transporting the sealable container from the site at which composting occurs to a site remote, or mixing station, where remixing occurs, and/or an apparatus for dumping or tipping the container at the mixing station.

DETAILED DESCRIPTION OF THE INVENTION

Figure 1:
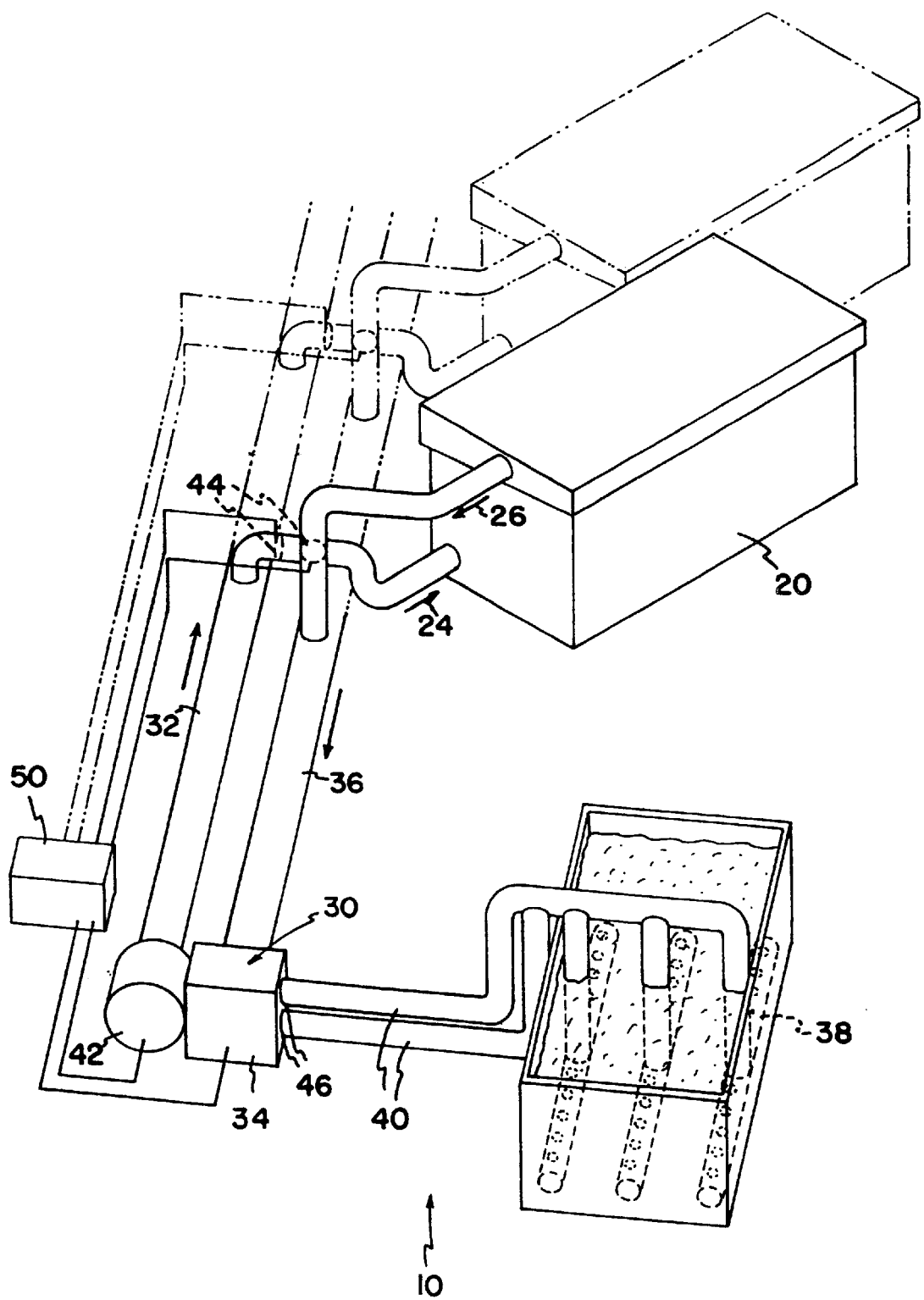
FIG. 1 is a schematic diagram of the composting system of the invention.
Figure 2:
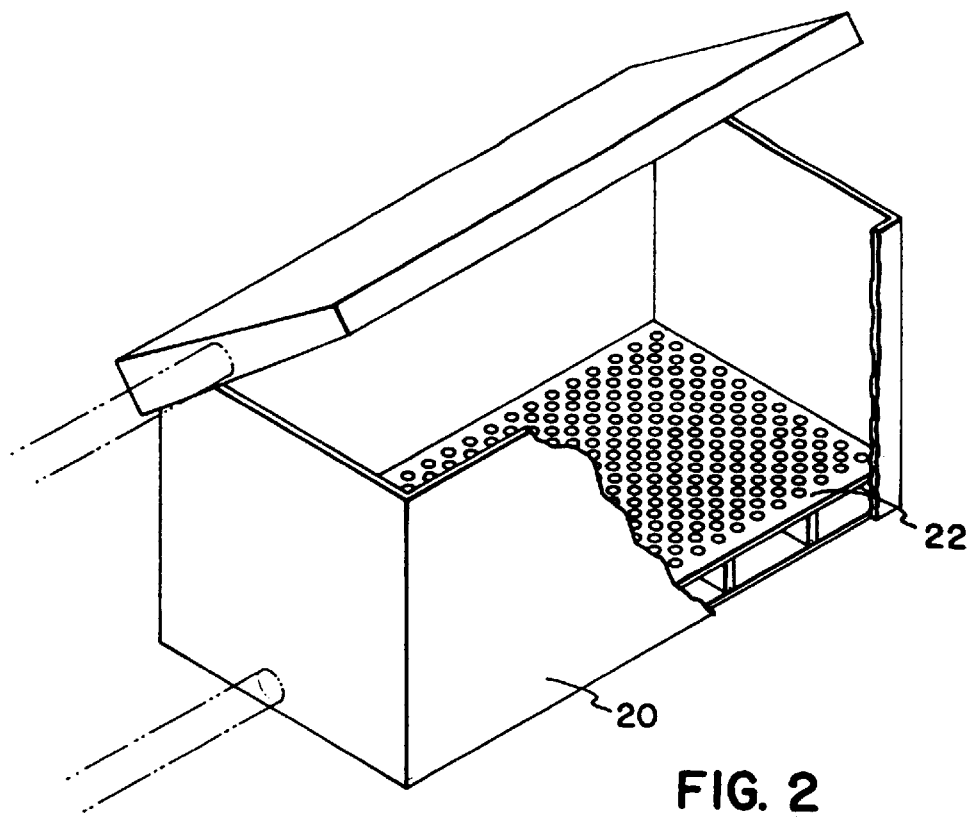
FIG. 2 is a schematic diagram of a sealable container including a perforated false floor.
Figure 3:
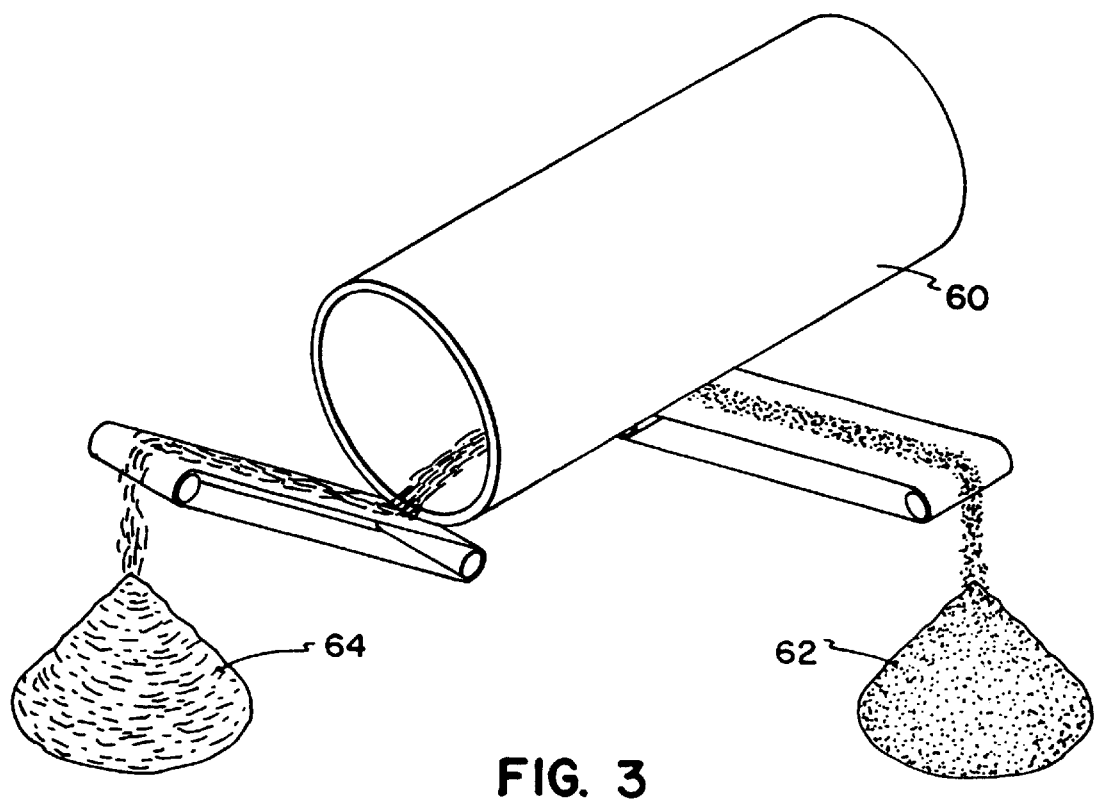
FIG. 3 represents a process for screening bulking material from the finer composted organic material.
Figure 4:
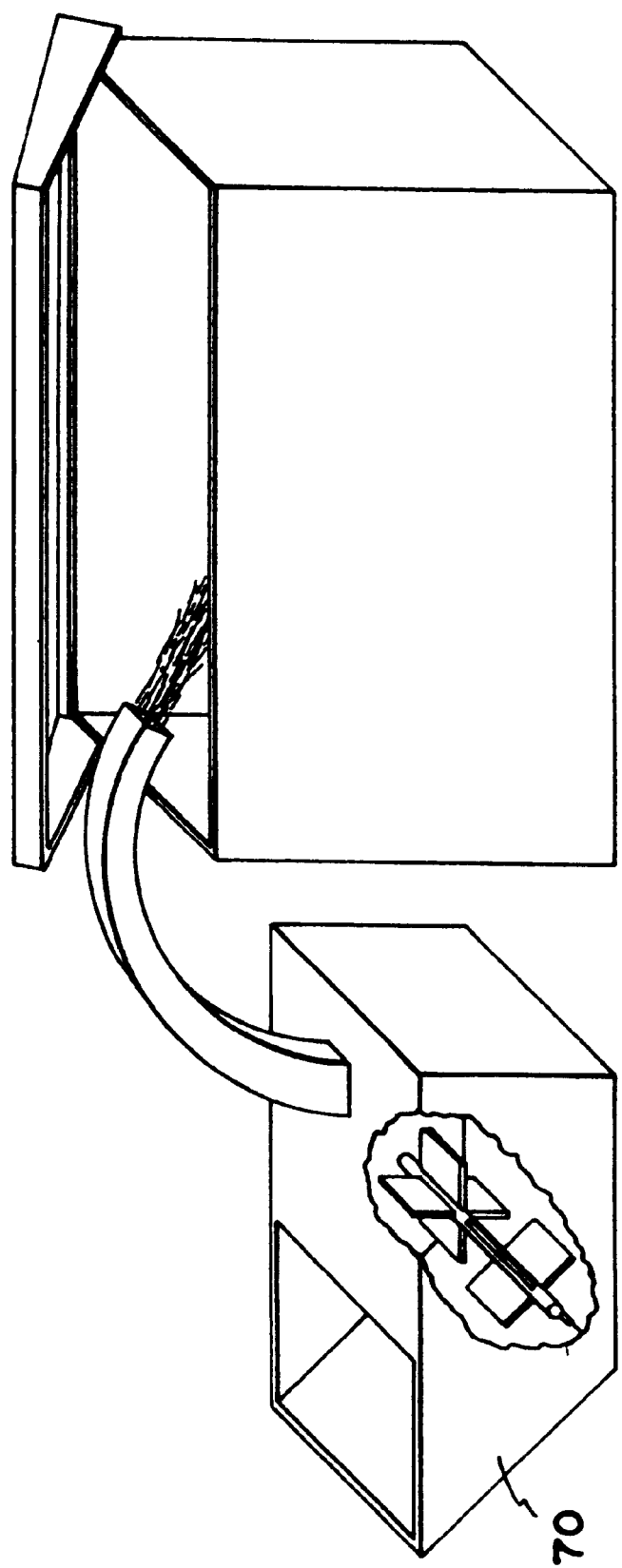
FIG. 4 shows a schematic of a mixer adding material to a sealable container.

The present invention provides a method of composting large quantities of organic material under controlled, preselected conditions. Conditions such as the temperature, water level, carbon content, oxygen supply, and microbial activity are monitored and adjusted to maintain the composition of the material within preselected limits that are compatible with the composting process. Amending and adding bulking agent and inoculant adjusts the composition of the organic material to within preselected limits. Amending the organic material makes it more compatible with the composting process by, for example, adjusting its carbon and water content. The bulking agent typically adjusts the oxygen content by adding air spaces or porosity to the mixture. If the organic material is toxic, or otherwise incompatible with composting, the amount of inoculant can be increased to provide sufficient microbial activity for effective composting. These adjustments are made to start the composting process at conditions within preselected limits.

During the composting process, conditions are monitored so that they can be maintained within preselected limits compatible with the composting process. Should the conditions vary outside the preselected limits and become incompatible with the composting process, the conditions can be adjusted by procedures such as remixing or aeration. Aeration can be particularly useful for maintaining the temperature and oxygen content of the composting mixture, for example, by adding oxygen and removing heat. A biofilter removes undesirable odors and moisture from the process air. Remixing includes adding additional amendments, bulking agent, or inoculant to adjust conditions such as carbon content, water content, and microbial activity. Remixing is accomplished by removing (e.g., dumping) the composting material from the container, amending, and then returning the mixture to either the container or to a curing bin. The object is to maintain the conditions within preselected limits for effective composting. The invention provides methods and apparatus for composting under controlled, preselected conditions.

The Apparatus of the Invention
The Sealable Container

Although this composting method can be carried out in a variety of configurations of composting apparatus (10), the basic composting apparatus includes one or more sealable containers (20). Sealable container (20) is more than just a box in which composting can occur. Of course, sealable container (20) must be sufficiently large and durable to stand up to the composting process and associated material handling. The size and number of containers is determined by the volume of material to be processed, the available surge capacity, and the frequency of remixing. For example, sealable containers (20) can be as small as 1 cubic yard and be effective for the composting process. It is desirable for sealable container (20) to be sealable to retain leachate, exclude rain water, and prevent the spreading of malodorous gases which can result from the composting process.

Process control plays an important part in the configuration of sealable container (20). For rectangular containers, a cross section area (taken perpendicular to the longitudinal axis) of about 8 feet by about 8 feet provides most effective composting. For example, this cross section is more effective than rectangular containers measuring, for example, 12 feet high, 16 feet high, or 30 feet wide. The length of a rectangular container can be varied over a range while maintaining this optimal cross-sectional area. For example, containers as long as 50 feet have proven effective for this composting method.

A sealable container (20) allows control of the composting conditions. The exclusion of rain water allows the operator to control the water content of the composting mixture and controllable air flow allows control of the temperature. Sealable container (20) includes a perforated floor (22) that allows delivery of air beneath the composting mixture (24), air flow up through the composting mixture, and exhaust of air (26) and other gases from above the composting mixture. The perforated floor (22) should equally distribute the air throughout the sealable container (20). In one preferred embodiment the air supply system is provided as four zones. Dampers control the pressure in each zone so that an equally distributed flow can be maintained. It is preferred that the perforated floor (22) is essentially flat and horizontal in order to minimize space not available to be occupied by the composting material. The air flow inlet to the sealable container can be placed at any location near the bottom of the container, for example at the center of the end of the container or in the longitudinal side offset from the center towards one end of the container. Preferably, multiple air flow inlets, each with a reciprocating damper, are used. However, in some container configurations it can be most convenient to place the air flow inlet near the top of the container. The air flow outlet is preferably located above the surface of the composting mixture.

In addition, sealable container (20) can include sensors, for example, a thermocouple or other temperature sensor, or other apparatus for monitoring incubating conditions and for detecting the content of the composting mixture. Sealable container (20) can include a drain for leachate collection. The lines from the drain can be heated in cold climates to prevent freezing of the leachate.

The sealable container (20) should be fairly rigid, so that it is be able to withstand any harsh elements such as driving winds, rain, ice, etc. and maintain its integrity under the force of the composting mixture against the walls of the container without bulging outwards. The sealable container should maintain its structural integrity during transport and be able to withstand any twisting, bumps, pulling, pushing and the like which it can encounter during the filling, lifting, transport and dumping of the container. The container must be able to withstand repeated lifting and dumping. In some embodiments, it can be desirable to have ladders and the like attached to the side of the sealable container to allow access to the top of the container and to aid in maintenance.

The sealable container (20) can be constructed from materials such as metal (stainless steel, iron, aluminum, etc.), plastic (polyethylene, polycarbonate, polypropylene), wood, or reinforced or composite materials. The walls of the sealable container should be sufficiently thick and strong to withstand punctures, dents or other defects which can be caused by large pieces of debris in the composting mixture or by the various steps in the transport and dumping process. The container can be painted or otherwise treated to protect the surface from exposure. The container can be equipped with a liner.

Sealable container (20) can be any size, but preferably has a useable volume of from 1 cubic yard to 120 cubic yards. The size of the sealable container (20) used should be designed to work best in the particular location and system. However, the sealable container (20) should not be overly large so that it is not capable of being moved and the composting material dumped therefrom. For example in a large area, in order to optimize space and processing equipment, it is preferable that the size of sealable container (20) ranges from about 10 cubic yards to 80 cubic yards, although any size will be acceptable. For small areas, such as urban sites, smaller containers, such as 1 cubic yard, can be most economical and feasible. Common sizes for containers, such as containers used for commercial and residential rubbish removal, include 10, 20, 40, 50, 67 and 80 cubic yards. These rubbish containers are available in a "roll-off" form. Intermodal containers, those that are designed for large scale transport, such as on ocean going freighters, are also useful containers. In a preferred embodiment, sealable container (20) is large enough to contain about 40 cubic yards of composting mixture and can be similar to a 40 yard commercial waste container or an intermodal container. The dimensions of sealable container (20) can range from 3 feet by 3 feet by 3 feet to 20 feet by 20 feet by 20 feet; preferably, sealable container (20) is larger than 4 feet by 4 feet by 4 feet. The height and/or width of the sealable container can range from 3 feet to over 30 feet. A preferred size sealable container size is an 8 feet by 8 feet end section having up to and including a 50 foot length.

Preferably, sealable container (20) is rectangular or square for ease of loading, transport and dumping, however other shapes such as cylinders (oriented with the longitudinal axis either horizontally or vertically) can also be used.

The size and number of sealable containers should be similarly determined based on the projected compostable material inputs and desired outputs, with capacity to expand. A typical composting system can contain 4, 7, 20, or more sealable containers (20). A 40 cubic yard sealable container can hold 20 to 25 tons of compostable mixture at a 60% moisture content, which is about 1 ton per day of compostable mixture based on a 21 day retention time. When used for 7 day retention, a system with a single 40 yard container can handle about 3 tons of compostable material per day. Optimal locations for the composting system of the invention include inactive or underutilized railroad yards and shipping ports, and other under utilized areas that are easily accessible, for example salt flats, desert areas, and old warehouse areas. Small systems can be located in highly populated urban areas, for example at nature centers, recycling stations, and under overpasses or viaducts.

Sealable container (20) should be sufficiently large to provide room for various auxiliary features, such as the air inlet, air outlet and a leachate drain. Depending on the shape and size of sealable container (20), it can be desired to have a side door in one of the vertical walls in addition to the lid on the top of the container. For example, a rectangular container can have a hinged door at one end for dumping of the composted mixture therethrough. Alternately, the composted mixture can be removed through the top lid of the container, preferably by dumping. Each container (20) has a top lid, which seals moisture and odors in the container and keeps rain and other elements out. The lid can be continuous across the top of the container (that is, one lid), or the lid can include several sections that may or may not be connected to each other. Preferably, the lid is hinged to the side of the container. If more than one lid section is present, each lid section may be directly hinged to the container side. Sealable container (20) can include optional features such as access doors for maintenance, ladders for easy access to the lid, rain gutters to control rain run off, or portholes for visual in situ observation, however these features should not hinder the moving and dumping of the container.

During the decomposition process, the sealable containers with composting material inside can be located at a site remote from the mixing station where the containers were filled. This site where the sealable containers are located is called "site remote", which designates that the container must be transported some distance, for example, about 10 yards to about 100 yards, or up to about 1000 yards to the mixer.

After sufficient decomposition of the compostable material has occurred, sealable container (20) is moved from remote site back to the mixing station where the mixture is dumped and remixed. In some circumstances, the mixing station can be adjacent to the composting site or location, so that actual transport of the container is not necessary. It is preferred that sealable container (20) is sized so as to fit on a flat bed truck, roll-off truck or a similar vehicle. Depending on the size of the sealable container and the size of the truck, it may be possible to transport two or three sealable containers simultaneously. A fork truck can be used to transport the smaller sealable containers from the composting site to the mixing station.

The sealable container (20) can be dumped, i.e., emptied, by the same vehicle that transported the container. For example, the fork truck used to transport a 1 cubic yard container can also tip the container and dump the contents. Alternately, the container can be dumped by a separate piece of machinery, for example, a crane.

Air Management Apparatus

Sealable container (20) can also include air management apparatus (30) for delivering air to the composting mixture. Air management apparatus (30) aerates the composting mixture. Such apparatus can include components for delivering air to the sealable container (32), for monitoring and controlling the delivery of air (34), for exhausting air from the composting mixture and the sealable container (26 and 36), for filtering or removing condensate from exhaust air (38), and for recirculating or expelling exhaust air (40). For example, a blower (42) can move air through conduits (24 and 32), with the path and rate of air flow controlled by dampers (44), into the bottom of sealable container (20). The air is propelled through perforated floor (22) in sealable container (20) and permeates the composting material. Preferably, a manifold is provided on conduit (24) to divide the air into multiple zones. In a preferred embodiment, the entering air is divided into four zones, where each zone has a reciprocating damper for equalizing the air flow among the zones. Air leaving the top of the composting material can enter conduits (26 and 36) leaving the container and leading to a port (46) from which it is expelled into the environment or it can be conducted into filtration or condensation apparatus (38), for example, a biofilter. Advantageously, the rate and direction of the flow of air during aeration is maintained by dampers (44). Dampers (44) are significantly less expensive than other means for controlling the rate and direction of air flow, such as controlled speed or variable speed or volume fans.

The air management apparatus (30) can include manifolds, baffles, electronic controls for the manifolds and baffles, devices that monitor and regulate the direction and rate of the air flow, and other systems to effectively distribute air through the container to control the conditions of composting. Air management apparatus (30) can also include a biofilter or condensate collector (38) that absorbs or collects water and other products in the exhaust flow. This can be useful for regulating the water content of the composting mixture and for preventing the escape of malodorous or toxic materials in the exhaust flow.

Sealable container (20) and air management apparatus (30) can be insulated to aid in maintenance of an effective composting temperature. In addition, the air management apparatus might include a heated air exhaust system, or other systems required for regulating the temperature of the air that is added to or removed from the composting mixture. As the air is moved through the air management apparatus, the biofilter, and the composting material, the moisture content in the air may increase and condensation can appear. The air management apparatus can include a condensate and leachate collection and capture system. This capture system can include drains in the biofilter, the blower, and the discharge manifold. The drains and the lines leading from the drains can be heated to prevent freezing of the condensate. It may be desirable to occasionally stop or decrease the air flow through the conduits (24 and 32) and other air management equipment in order to let any trapped moisture condense and drain.

Control Unit

The control unit (50) can include apparatus to monitor, record, report or adjust conditions of the composting process and apparatus. The control unit can include sensors for conditions such as temperature, oxygen content, carbon dioxide content, water content, air pressure, baffle position, and other conditions throughout the system. The signals from the sensors can be monitored and used to adjust the conditions of the composting process and apparatus. The signals from sensors can be monitored by systems such as a microprocessor or computer. In such a manner, the control unit, sensors and adjustment of conditions can form a feedback control system for maintaining composting conditions within preselected limits. For example, the control unit can include a signal to alert the operator that composting conditions need adjustment through remixing.

In one embodiment, in response to the sensors, the control unit can adjust the function of the air management apparatus. The control unit can include a mechanism to monitor and control forced air delivery for process control strategies based on oxygenation, temperature feedback, or both. For example, in response to a signal from a thermometer or an oxygen sensor, a computer in the control unit can signal a baffle or a blower to change the direction or rate of air flow to maintain the oxygen level or temperature within the containers within the preselected limits. Dampers can also be used to control the air flow through the containers. Preferably, the dampers are reciprocating dampers that can be controlled by control by control unit (50) in response to the air pressure (or backpressure) in the conduit or containers).

Additional Apparatus

The apparatus for composting can also include apparatus for screening the composting mixtures (60) to separate fine (62) from rougher material (64). Additional components of the apparatus can include a mixer (70) such as an auger or other common apparatus for handling organic materials such as silage mixers and the like. Advantageously, the mixer is external to the sealable container and can be located at the mixing station.

Biofilter or Condensate Collector

Air management apparatus (30) can also include a biofilter or condensate collector (38) to absorb or collect water and prevent the escape of malodorous or toxic materials in the exhaust flow. In a preferred embodiment, air removed from sealable container (20), after passing through composting mixture, is passed through biofilter (38) to remove moisture, malodorous fumes, and to remove any toxic materials. It is generally desired to decrease the amount of moisture or humidity in the air being used to aerate the compostable mixture Biofilter (38) is located adjacent the sealable container and air management system and is connected to the air management system by a series of conduits (40). Biofilter (38) includes a container filled with a porous organic material having an air inlet and an air outlet. Examples of usable porous organic material include wood chips and shavings, brush and branches, charcoal, and shredded tires. This porous organic material can be mixed with other organic material such as dirt, gravel, or already composted material. A preferred biofilter filler material is about a 2 to 1 weight ratio of wood chips to completed compost.

Figure 5:
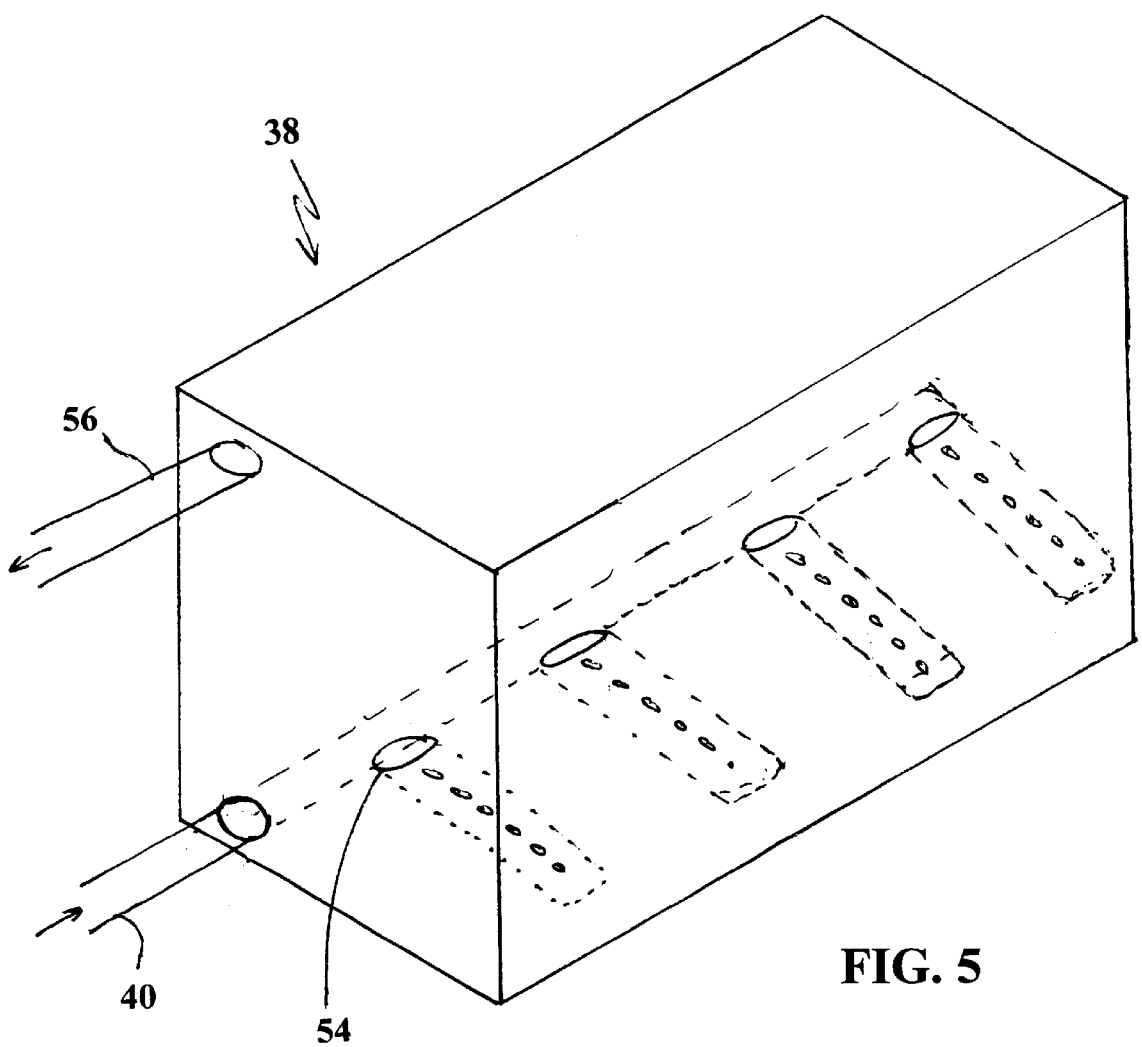
FIG. 5 is a schematic diagram of an embodiment of a biofilter of the invention.

Contaminated air from sealable container (20) enters biofilter (38) through an air inlet via conduit (40), passes through the porous organic material and exits biofilter through the air outlet (56). This filtered air is recirculated through blower (42) and sealable container (20). Preferably, the air enters the biofilter through the inlet at the base of the container and is distributed throughout the area of the biofilter by either a perforated floor, perforated pipes as shown in FIGS. 1 and 5) or the like. In a preferred embodiment, the incoming air is split into four zones by a manifold system. Reciprocating dampers (54) are used to equalize the air flow between the four zones. The contaminated air then filters through the porous organic material which strips and/or cleanses the air of any toxins, odors, excessive moisture and other undesirable additives. Preferably, the porous organic material causes the moisture in the air to condense, providing a drier, cleaner air stream that can be recycled to the sealable containers. The cleansed air exits the biofilter through an outlet located at the top of the container. In some embodiments, it may be desired to have the air inlet located near the top of the biofilter container so that the air is forced down through the filter and out at the bottom of the container.

The biofilter container is preferably about 20 cubic yards, but can range from about 1 cubic yard to about 80 cubic yards. In a typical system, the ratio of volume of sealable container of composting material to biofilter is about 8:1. That is, for each 8 volumes of composting material or sealable container, the system preferably includes 1 volume of biofilter. In one preferred embodiment, the biofilter is an intermodal container filled approximately 1 yard deep with the porous organic material. The container can be square, rectangular, cylindrical or any other shape and can have any optional features located thereon. An end door can be located on the biofilter container to simplify the removal and/or refreshing of the filler material. Biofilter (38) may or may not be sealed or have a cover thereon. More than one biofilter can be used, depending on the volume of air to be treated. Multiple biofilters can be arranged in parallel or in series.

When the porous organic material in the biofilter has become saturated with moisture and odors, or is otherwise unusable, the biofilter can be removed from its location and dumped, similar to sealable container (20). Biofilter (38) can then be restocked with fresh porous organic material and be returned to service. In some situations, it may not be necessary to remove the used material but instead, to place additional organic material on top of the older material.

Curing Bin

In one optional yet preferred embodiment of the apparatus of the present invention, the composting process includes removing the composting material from the sealable container, dumping the material, remixing, optionally returning to the container and again composting and dumping, and then moving the mixture to a curing bin for further composting or aging when the process has stabilized.

The compost material is typically transferred from the sealable composting container to the curing bin after it is no longer necessary to control the temperature of the composting material. During composting (in the sealable container) it is preferable to maintain a temperature between about 40 and 60° C. If a temperature greater than 60° C. is reached, the thermophiles that cause decomposition cannot survive, and the composting process will stop. The composting process is an exothermic process, that is, it creates heat. In the sealable bin, air flow is used to control the temperature of the material so that excessively high temperatures, i.e., greater than about 60° C., are not reached. However, once the composting material is at a point where the composting process produces temperatures safely less than 60° C., the material can be transferred to the curing bins where a safe and stable temperature is maintained without the need for cooling with air.

Use of a curing bin frees up space in the more expensive sealable container and decreases the overall time for the composting process. Generally, if the final step of the composting process will be storing the compost in a curing bin, only one or two remixing steps will be required prior to storage.

The curing bin is similar to the sealable container in that it can include air inlet and outlet ports so as to provide air to the composting mixture, but the bin has no lid and overall the bin is generally less expensive. The air is provided to the composting mixture not to control the temperature of the mixture, but to provide an oxygen source to allow continued decomposition.

The curing bin is preferably about 40 cubic yards, but can range from 1 to 80 cubic yards. Generally, there are the same number of, or less, curing bins than sealable containers in the system. Typically, the curing bins are the same size as, or smaller, than the sealable containers. The curing bin can be square, rectangular, cylindrical or any other shape and can have a cover or no cover. Preferably, there is no permanent or solid cover or top over the curing bin, but instead it has a permeable cloth cover. The cover is selected to allow air and minimal moisture flow therethrough, but to seal in any undesirable odors. Any cloth that provides the desired properties is useable, but a preferred cloth material is available from Gore Company under the trade name Gortex™.

In some installations, it may be desired to have rain gutters located on the upper outside edges of the curing bin. These gutters can help in maintaining a clean composting site. As the composting material in the curing bin, which is typically heaped above the lip of the bin, further matures and cures in the bin, moisture given off condenses on the inside of the cloth cover. Due to the downwardly convex shape of the cover, the moisture runs to the edges of the bin where it is collected by the gutters.

The Method of the Invention

In general, the method of the present invention includes mixing compostable materials to form a compostable mixture, placing the mixture in a rigid sealable container, allowing the mixture to incubate in the container, removing the mixture from the container and adding additional compostable material, and replacing the mixture in the container. In more detail, the incoming compostable material is sorted to classify the type of materials. The material can then be ground, shredded or chipped depending on the desired size or consistency. Depending on the moisture content, the carbon content, and the carbon-nitrogen ratio, the material is mixed with other compostable materials and/or water to provide the desired properties. This compostable mixture is loaded into a sealable container, sealed, and moved to a site for the incubation process. Once in place, air and condensate lines and any sensors are connected to the container and the mixture is allowed to incubate.

During incubation, the conditions in the container are monitored, either continuously or intermittently. The temperature and moisture content in the composting mixture can be controlled by the addition of humidified air to the container. The mixture incubates undisturbed until it is determined that the mixture needs amendment, that is, additional material added thereto. The air, condensate and sensor lines are unhooked from the container and the container is transported to a mixing station where the mixture is dumped from the container, typically by tipping the container. The mixing station can be immediately adjacent the incubation location, or can be remote therefrom. Once the mixture has been removed from the sealable container, water, wood chips, additional compostable material, or any other amendments can be added to the mixture. This new mixture is returned to a sealable container which is moved to the incubation site, and the composting process continues.

This process can repeat itself until a satisfactory final product is obtained. Alternately, it may be desired at some point in the process to transfer the composting mixture to a curing bin rather than a sealable container. The partially decomposed mixture is placed in the curing bin, where it is covered with a porous flexible cover and allowed to sit and cure. This curing process can be located at the same location as the incubating process.

Organic Material

The method of the invention composts materials such as organic material under preselected conditions to produce compost or composted organic material. Initially, the organic material to be composted is obtained and its composition is evaluated. Aspects of its composition such as its water and carbon content are evaluated so that these conditions can be adjusted to within the preselected limits. Such adjustment is desirable because various organic materials have varying degrees of compatibility with the composting process.

A variety of organic materials can be composted by this method so long as their composition can be adjusted to be compatible with the composting process. The organic material is predominantly organic, but can contain inert, inorganic, and other components as well. For this method, the organic material must be compatible with microbial degradation when included as a portion of the total organic material in the composting process. Incompatible organic material can slow or hinder microbial degradation or composting. Composting of material of limited compatibility can be achieved, for example, by composting it in a mixture with more readily composted organic material. The organic material need only be compatible with the composting process when present in some degree in the total organic material composted. The composting and degradation need only occur under the conditions of time, temperature, moisture, and the like, described as effective for the method. An organic material can be mixed with other organic material, with soil, or with another matrix.

The organic material can be sludge, such as municipal waste water treatment residuals or industrial waste water treatment residuals. The organic material can be biosolids, which is waste water residual from a publicly owned waste water treatment plant. Another type of organic material is waste and byproducts from processing crops, foods, and other agricultural products. Animal processing waste and byproducts, such as entrails or carcasses, are organic material that can be composted. Manufactured or industrial products can be compostable organic material as well. Compostable manufactured or industrial products include manufactured cellulose products, explosive materials, petroleum products, agricultural chemicals, and the like.

The composting method is advantageous for composting biosolids. Biosolids are an odorous composition that can be produced in large volume, and which must be thickened and managed to prevent production of annoying odors. Traditional waste water treatment processes are only marginally effective for reducing volume and odor. Typical processing by mechanical thickening and concentration by the use of clarifiers and flocculating agents produces effluent that is only about 1% solids. This mixture can be processed further through a belt press or a centrifuge or by addition of polymers to yield biosolids. Conventional processing can yield as biosolids an organic material that includes water and about 12 percent by weight to about 22 percent by weight solids. Typically the biosolid organic material from municipal waste water treatment will be about 15 percent by weight to about 20 percent by weight solids. The composition of such biosolids can be adjusted to make it compatible with the composting process.

The composting method is also advantageous for composting agricultural byproducts such as soy waste. These byproducts can accumulate at processing facilities, and disposal or storage of such byproducts, which can be voluminous, can be expensive. Accumulated byproducts decomposing in the open can get wet and produce compounds that are toxic or that have unpleasant odors, such as ammonia. This is particularly true of waste from processing soybeans. Soy waste includes soybeans, spoiled soybeans, soybean pods, soy powder, soy cull, soy flour, and other byproducts of soybean processing. If soy waste decomposes in the open, it produces a foul smell and ammonia. If ventilation is inadequate, persons could pass out from the fumes. In a sealable container used in the composting method, the odors produced by composting an organic material such as soy waste are kept from contact with humans.

Continuous or intermittent evaluating and adjusting the composition of organic material can allow composting of toxic or otherwise incompatible material. The process of composting toxic or otherwise incompatible organic materials is called "remediation" or "bioremediation". Toxic or incompatible organic materials that can be remediated include hydrocarbons and synthetic organic compounds such as herbicides, pesticides, oil, petroleum products, diesel fuel, gasoline, hydraulic fluid, obsolete ordinance, and TNT. Soil including about 2% oil, other petroleum distillates or synthetic organic chemicals can be readily composted by mixing with other organic material. Biosolids is a preferred organic material for adjusting the content of toxic or incompatible organic material. For example, once the presence of such incompatible materials is known or suspected, their amount can be kept to compatible low levels or they can be mixed with a compatible material. Preferably in remediation, the soil or other matrix contaminated with the incompatible organic material is mixed with organic material that is already at least partly composted.

The organic material can come in many forms that have various degrees of compatibility with composting. Many of the characteristics of these materials can impact the composting process and can be adjusted by subsequent steps such as amending.

Amending and Amendments

Amending the organic material adjusts its composition to bring it within certain preselected limits. The composition of the organic material is adjusted to benefit the composting process to make it more compatible with the composting process. A material added to amend the organic material is called an "amendment".

Benefits of amending include decreasing the time necessary for composting, increasing the extent to which the organic material is degraded, decreasing production of odor, and reducing additional manipulation of the material. One goal of amending is to adjust the composition of the organic material to facilitate the growth and activity of microbes that cause composting. For example, the composting process and the microbes are sensitive to the proportion of water and carbon in the organic material. Preferably, the organic material is amended to adjust the water content or the carbon content of the material. Preferably, the amendment is mixed with the organic material.

One goal of amending the organic material is to adjust its water content to a level that is compatible with composting. A water content compatible with composting is preferably within the range of about 40 percent by weight to about 60 percent by weight water, which are preferred preselected limits for water content. A water content less than about 40 weight percent if disadvantageous. However, the composting process is facilitated by a water content near the middle of the range. Preferably, the water content will be about 50 percent by weight. Of course, some organic material will come with an appropriate water content and amendment will not be required to adjust the water content.

A higher water content is compatible with composting in certain circumstances and for certain organic materials. For example, some organic materials may be more compatible with composting at higher water content. In addition, during the composting process the composting mixture can dry out. In this event, starting with a higher initial water content can prolong the time before additional water must be added to the composting mixture. Thus, in some instances, it is desirable to start with a water content of about 60 percent by weight. Starting with this high initial water content can require careful control of composting conditions.

Unamended organic material can include as much as about 80 weight percent to 85 weight percent water or more, and requires amendment to be compatible with composting. When the water content of the organic material is higher than desired to start composting, the amendment must decrease the proportion of water in the organic material. Such an amendment can be an absorbent material. Amendments suitable for decreasing the water content of an organic material include paper, cardboard, sawdust, leaves, straw, certain organic materials, older compost, animal manure, bulking agent, and mixtures of these materials.

To reduce the water content of the organic material, the amendment needs to have lower water content than the unamended organic material. Paper, for example, typically is about 8 percent by weight water, so it is advantageously used with organic materials of higher water content. Sawdust typically includes about 12 percent by weight to about 16 percent by weight water. Although more sawdust than paper would have to be added to an organic material to achieve equivalent amounts of reduction in the water content, sawdust is still a very good amendment. Leaves and straw typically have higher water content, about 30 percent by weight water. Despite the higher moisture content, straw and leaves are still suitable amendments, but they must be added in larger quantity to the organic material.

Some organic material can have less than about 40 weight percent to about 60 weight percent water. Water, another amendment, or other organic material can be added to such organic material to bring the water level within the desired range.

Amending the organic material can also adjust the carbon content of the organic material to make it compatible with composting and to bring the carbon content to within preselected limits. Carbon content is typically described by the carbon:nitrogen ratio. Excess nitrogen can, but does not necessarily, hinder microbial degradation of the organic material, and it can have other undesirable effects. For example, in the presence of excess nitrogen, the composting process can release ammonia and other nitrogen-containing compounds which can be malodorous. In addition, excess nitrogen in the composting mixture can result in volatilization of nitrogen and depletion of nitrogen from the composting mixture. This depletion is undesirable because nitrogen is a valuable supplement to soil that can aid plant growth. Hence, goals of amending the organic material include attaining a carbon:nitrogen ratio that decreases odor, volatilization of nitrogen, or depletion of nitrogen.

Although composting can proceed with low carbon:nitrogen ratios, a ratio more than about 25:1 is preferred. A carbon:nitrogen ratio less than about 20:1 is disadvantageous. It is desirable for the organic material to have a carbon:nitrogen ratio of about 30:1 or higher for the composting process. A maximum desirable carbon:nitrogen ratio is about 35:1. A preferred carbon:nitrogen ratio is within the preselected limits of about 25:1 to about 35:1.

Typical organic materials are low in carbon and have a low carbon:nitrogen ratio. For example, biosolids are typically about 6 percent by weight nitrogen, which results in a low carbon:nitrogen ratio of about 12:1. The carbon:nitrogen ratio is advantageously increased by adding a material with high levels of carbon. Amendments useful for increasing the carbon:nitrogen ratio of an organic material include paper, sawdust, leaves, straw, older compost, animal manure, a bulking agent, and mixtures of these materials.

Occasionally an organic material can have a carbon:nitrogen ratio that is too high. In that case the ratio can be decreased by adding a material with a lower carbon:nitrogen ratio. Such materials include ammonia, urea fertilizer, an organic material high in nitrogen, or other amendment high in nitrogen.

One advantage of this method of composting is that it allows composting at wide ranges of water content and carbon:nitrogen ratio. For example, this method is effective at water content as high as about 60 percent by weight or a carbon:nitrogen ratio as low as about 25:1. Composting at these values can be advantageous because it allows the use of smaller quantities of amendment. Less material needs be added to adjust the water content or the carbon content of the compostable mixture, which can save the time and money expended in the purchase of amendments and the space to store it. In addition, this provides for composting more organic material in each volume of container space.

The amount of amendment to be added can be readily calculated. Routine analysis of the organic material and amendment can determine pertinent characteristics of each material, such as water content, carbon content, nitrogen content or carbon:nitrogen ratio. Then, for example, knowing the weight percent of water for both the organic material and the amendment and the weight of the organic material allows calculation of the amount of amendment to be added to the organic material to yield the desired weight percent of water in the amended organic material. Similar calculations can be performed to amend other characteristics of the organic material.

It is advantageous to evenly mix the amendment into the organic material. Mixing can cause the amendment to be unifornmly distributed through the organic material so the character of the organic material is uniform. Mixing the amendment can be accomplished simultaneously with mixing the bulking agent and inoculant.

Bulking Agent

The composition of the organic material is also adjusted and made more compatible with the composting process by adding a bulking agent. The bulking agent can be added to or mixed with the amended organic material during formation of the mixture that is actually composted, the compostable mixture. The bulking agent or bulking material can provide several useful functions in the composting process. Preferably, the bulking agent increase the proportion of solids in the compostable mixture. Preferably, the bulking agent increases the amount of air in the compostable mixture.

The bulking agent can be important to the oxygen content and bulk structure of the composting mixture. For example, the bulking agent can create air spaces or voids in the compostable mixture that are maintained in the composting mixture. These air spaces contain oxygen, which is required for microbial activity in the composting process. In addition, these air spaces or voids can affect the handling properties of the compostable or composting mixture. A material including voids or air spaces is more easily manipulated in handling steps. Voids or air spaces can provide a pathway through the composting mixture through which air, oxygen, and other gases created during composting can move.

The bulking agent can also serve as an amendment The bulking agent can reduce the moisture content of the compostable mixture; by providing moisture absorbency. The bulking agent can also provide some carbon to the compostable mixture, which can adjust the carbon content of the compostable mixture.

The amount of bulling agent added can be determined by the amount of free air space that must be added to the organic material to form the compostable mixture. The free air space of each of the ingredients, including the bulking agent, can be determined and these ingredients can then be mixed to achieve the desired level of free air space. The amount of free air space can be determined by measuring the air flow through the mixture. For example, the number of cubic feet of air per minute that flow through the mixture can be determined with a sensor that measures air flow. This can be converted to the free air space in the mixture. The level of free air space can be as low as about 10% or as high as about 65% by volume. The free air space for a particular organic material or for a compostable mixture of a particular composition is selected to be a level that is compatible with effective composting. Preferably, the free air space is in the range from about 20% to about 35% by volume in the compostable mixture. The desired or effective amount of free air space can be maintained through the composting process by remixing to add bulking agent. Establishing and maintaining an effective amount of free air space can maintain effective aeration of the composting mixture.

Preferred bulking agents include wood chips, shredded brush, straw, rice hull, peanut shells, pelleted paper, shredded tires, plastic material in various shapes and configurations, and mixtures of these bulking agents. Advantageously, the bulking agent can include inoculant as well.

The bulking agent can be removed from the composting mixture or from the composted organic material during remixing or at the end of the composting process. The bulking material can be removed either manually or using a machine, for example, by screening it out. One screen suitable for sifting compost is a tromell screen which is an inclined rotating drum made of mesh (60). The fine material (62) falls through the mesh and is collected and fed by conveyor to a holding place. Bulking agent (64) recovered from material that has been composted typically contains inoculant. Thus, recovered bulking agent can be inoculant for composting subsequent batches of organic material.

Inoculant

The composition of the compostable mixture is adjusted to increase microbial activity from the inoculant. Although most organic material includes or is naturally contaminated with microbes active in the composting process, it is advantageous to add more microbes. Adding microbes is called "inoculation" and the microbes added are called the "inoculant". Inoculant is a seed culture that starts microbes growing in the composting mixture, which can provide greater control of the composting process. For example, inoculation can accelerate composting and can result in an advantageous mix of microbes in the composting material. Basically, the composting process is faster and can be more complete when started with more microbes.

The amount of inoculant is chosen based on the composition of the organic material or the compostable mixture. For different compostable mixtures and different organic materials the amount of inoculant is adjusted to result in conversion of the organic materials to composted organic materials within an acceptable time, typically more than about 3 days but less than about two or three weeks. The amount of inoculant added is seldom less than about 5 percent by weight of the total compostable mixture. When the organic material includes substances that are toxic to the microbes, that are incompatible with the composting process, or that are particularly difficult for the microbes to break down, the level of the inoculant can be increased to as much as 50% of the compostable mixture. High levels of inoculant allow effective composting in less than optimal conditions. Such high levels of inoculant are typical of and preferable in composting processes used for remediation. More typically, such as when the organic material is routine biosolids, the inoculant will make up about 5 percent by weight to about 20 percent by weight of the compostable mixture. Preferably, for routine organic material the inoculant makes up about 10 percent by weight to about 15 percent by weight of the compostable mixture. More preferably the amount of inoculant is about 10 percent by weight of the compostable mixture.

Typically, inoculant includes previously composted organic material. The old compost is used as a seed culture and contains active organisms that are mixed with organic material, amendment, and bulking agent to form a compostable mixture. Preferred inoculants include composted or composting biosolids, bulking agent recovered from composted or composting biosolids, aged and cured compost, compost from recent batches, microbes cultured for inoculating in various stages of decomposition, cultured and isolated microbes, and mixtures of these inoculants.

Mixing or remixing the amended organic material with the bulking agent and the inoculant can have several beneficial effects. Mixing can result in the inoculant or the bulking agent being evenly distributed through the composting mixture. Thus, the beneficial effects of the bulking agent or the inoculant will be uniformly distributed through the composting material. This results in more efficient and more evenly distributed composting of the composting material.

Inoculant can be added to the composting mixture under controlled conditions by remixing. An inoculant can be added for a particular purpose. For example, during composting inoculant can be added to introduce microbes that degrade or consume particular components of the organic mixture, such as toxins. Remixing can also add inoculant that is effective to promote the decomposition of partially composted organic material. For example, some microbes can be effective to degrade the initial degradation products of some organic materials.

Incubation

"Incubation" is referred to as the process when composting occurs. The composition of the compostable mixture is adjusted to within preselected limits to be compatible with efficient composting during incubation. In general terms, incubating includes placing the compostable mixture in a sealable container under monitored and controlled conditions and allowing composting to occur. It is through microbial activity during incubating that composting occurs. The microbes grow, reproduce, feed upon and digest the organic material to produce composted organic material. Of course, the microbes can also digest the amendment, the bulking agent, other microbes and anything else that may be in the composting mixture during the composting process.

Incubating either the composting mixture or the remixed composting mixture involves similar considerations for maintaining conditions, timing, and the like. If, prior to completion of the composing process, the conditions of the composting mixture change and require adjustment for further composting, then remixing is appropriate. After the organic material is composted, it can be screened to separate composted organic material from larger, less degraded material. The composted material can be removed from the process and prepared for other uses or disposal.

Incubation is carried out for sufficient time to result in effective composting of the organic material although other durations can also be used.. Typically, an incubation period is 3, 7, 14, or 21 days in total for a batch of organic material. In some applications, the incubation for composting can be supplemented by retention in the sealable container for pathogen destruction. Pathogen destruction can be accomplished by 72 continuous hours of incubation at more than 55° C. under conditions described as "in-vessel composting" under the Rules for Biosolids Management of the United States Environmental Protection Agency, Part 503.

During the incubating process, the microbes feed upon the compostable mixture and decompose it. The volume of the decomposed or composted material decreases as the process proceeds, typically a 40% decrease in volume is seen with an about 7–21 day incubation. The decrease is volume is caused by various factors. For example, as the compostable material, for example the wood chips, brush, and organic solids, decrease in size, the air spaces between the pieces of material are minimized and compaction occurs. A large amount of water or moisture is produced by the incubation process which also causes a volume decrease. This water drains through the compostable mixture, through the perforated floor of the sealable container, and is collected by the leachate system outside of the container. Although the compostable material itself can decrease to a size where it would be able to pass through the perforations in the floor of the container, the composting material as a whole is generally non-flowable, and loss of composted material through the floor is minimal.

Monitoring and Adjusting Incubation Conditions

Throughout incubation the conditions of the composting mixture can be monitored to determine whether they remain within the predetermined limits that are compatible with composting the organic material. Monitoring incubation conditions is one of the advantageous aspects of this method of composting. Composting according to the method of the present invention is faster compared to uncontrolled composting and more complete when run under conditions that are maintained to facilitate composting. During incubation, the conditions of the composting mixture and the apparatus can be monitored either continuously or intermittently. Conditions of the composting mixture that can be monitored include, preferably, temperature, oxygen content, water content, carbon content, microbial activity, and combinations of these conditions. Ambient temperature can be monitored as well. Typical preferred conditions are those described for the compostable and composting mixtures.

Composting conditions can be monitored by sampling the composting mixture, which can require opening the sealable container, either via the top lid or a sampling chamber or orifice, or by sensors or detectors that are in the container, the air handling apparatus or the composting mixture. Monitoring can include overseeing by a worker skilled in the art who is able to sense the condition of the composting mixture by, for example, smell, sight, or touch.

Simple apparatus useful for monitoring the condition of the composting mixture include a thermometer, a hygrometer, an oven dryer, a pH meter, litmus paper, test papers sensitive to chemicals, an oxygen sensor, an air pressure sensor, a respirometer, a carbon dioxide sensor or analyzer, a volume digester, a humidistat, an air pressure sensor, a sensor for humidity in the discharge air, and the like. More sophisticated methods for monitoring conditions include electrodes and sensors that detect and determine levels of particular compounds or elements, and the like. Monitoring can be manual or automated. Monitors can store and process information using microprocessors and the like.

Should any of the incubation conditions be outside the preselected limits for conditions that facilitate composting, the conditions can be adjusted. A preferred method of adjusting conditions of the composting mixture is remixing. Since remixing requires labor and equipment, remixing only when necessary can result in significant economies. With effective monitoring of the incubation conditions, remixing can be done only when necessary. Another preferred method of adjusting conditions is aerating. Aerating consumes energy, so effective monitoring of conditions can minimize the expense of aerating as well.

Another advantage of this composting process of the present invention is that maintaining controlled incubation conditions result in rapid and complete composting of organic materials. For example, about 40,000 pounds of biosolids can typically be composted in a 40 cubic yard container in less than about 3 weeks. Remediation of about 30,000 pounds of soil contaminated with petroleum products or agricultural chemicals can be complete in a 40 cubic yard container in less than about 3 weeks. Proper choice of incubation conditions and monitoring to maintain these conditions facilitates rapid composting.

Temperature can be monitored by a electronic thermometer that is part of the air management apparatus. The temperature of the composting mixture can change during the composting process, and can be regulated to maintain the desired composting temperature. The thermometer can signal the air management apparatus to slow the flow of air when the temperature of the composting mixture is too low, and to increase the flow of air when the temperature is too high.

An electronic oxygen sensor as a component of the air management system could similarly regulate and maintain the oxygen level in the composting mixture. When the oxygen level is too low for microbial activity, air flow would be increased.

Water content or the carbon:nitrogen ratio can also change through the composting process and can be monitored in the composting mixture. Should the content of carbon or water be outside the desired range, the content can be adjusted by remixing to maintain levels in the desired range. Water content can also be adjusted by adding water to the container, and to some extent, by aerating.

Aerating

One method of adjusting conditions of the composting mixture within preselected limits is by aerating the mixture. In particular, aerating the composting mixture can adjust the oxygen content, temperature, and water content of the composting mixture. Aerating, which is typically accomplished by blowing air through the composting mixture, is desirable for increasing the oxygen level and decreasing the temperature of the composting mixture. Aeration can be accomplished by applying either positive or negative air pressure on the sealable container. Aeration can be either intermittent or continuous as required to maintain preselected composting conditions.

Aerating is a preferred method for maintaining and adjusting the temperature of the composting mixture. Controlling the temperature can maintain the efficiency of the composting process and decrease odor production. Furthermore, a controlled and uniform temperature provides for more reproducible production of composted material.

Temperature control is important because during incubation the microbes produce heat as they grow, reproduce, and degrade the organic material. The temperature of the composting mixture is maintained at a temperature that facilitates the composting process. Preferably, this is a temperature between about 40° C. and about 60° C. More preferably, the temperature is between about 50° C. and about 60° C. Above about 65° C. the microbes can start to self-pasteurize. That is, higher temperatures will kill the microbes or cause them to become dormant. Keeping the temperature of the composting mixture uniform and near about 60° C. is advantageous for increasing microbial activity throughout the entire composting mass and increasing the rate of composting. It is also advantageous to maintain the temperature of the composting mixture above about 40° C., because composting will become too slow at temperatures below about 40° C. Temperature control in a typical container can require continuous air flow at about 900 cubic feet per minute per 1,000 cubic feet of composting mixture.

The rate of aeration required to maintain composting temperatures in the container is typically much greater than required to provide oxygen for the microbes. Typically, intermittent air flow of about 100 cubic feet per minute per 1,000 cubic feet of composting mixture with air flow on for two minutes, then off for 24 minutes, is sufficient to provide oxygenation to support growth of microbes. Other oxygenation cycles can also be used, including continuous oxygenation.

Aerating can remove water from the composting mixture. Preferably, aerating is effective to maintain the temperature of the composting mixture within desired limits while minimizing, to the extent possible, drying of the composting mixture. In fact, water loss can be as high as about 2 percent by weight per day reduction in the water content of the composting mixture, but typically aerating results in water loss of about 1 percent by weight per day. The composting process becomes less effective when the water content is less than about 45 percent by weight, and the composting process is dramatically slowed by water content in the composting material less than about 40 percent by weight. Hence, it is advantageous to regulate air flow and monitor water content in the organic material to maintain an effective concentration of water to maintain the microbial activity.

Remixing

Remixing is another method of adjusting the conditions of the composting mixture to keep them within preselected limits. Remixing includes adding and mixing into the composting mixture an amendment, water, a bulking agent, inoculant, organic material, a composting mixture, a compostable mixture, and the like as necessary to attain conditions compatible with efficient composting. Some such conditions are described above with reference to amending the organic material. Remixing is preferably accomplished by removing the composting mixture from the container, i.e., dumping, and remixing it. Any effective material handling method can be used to remix the composting material. Remixing is advantageously done to adjust conditions of the composting mixture to increase microbial activity and facilitate the composting process.

In one embodiment of the present method, the sealable container is moved to an external mixer, the composting material is removed from the container, and remixing is accomplished by the external mixer.

In a preferred method of the present invention, the composting mixture, while in the sealable container, is transported from the site remote (where the compostable mixture is incubated) to a mixing station where the mixture is dumped from the sealable container, remixing is performed, the mixture is loaded into the sealable container, and the container is transported backed to the site remote. In one embodiment, the site remote is located adjacent the mixing station so that the sealable container does not have to be transported but can be dumped at the site remote which is where the mixing station is located. In another embodiment, the site remote is located at some distance, for example 100 yards, 200 yards, half a mile, 1 mile, and even farther from the external mixer at the mixing station.

Remixing can adjust one or more of water content, carbon content, temperature, microbial activity, or other conditions of the composting mixture. Thus, one or more remixing steps can control the composition of the composting mixture throughout the composting process.

For example, it is advantageous to remix to control the water content. The water content of the composting mixture can be sampled throughout the composting process. Should the moisture content fall below a preselected limit, remixing can be done. A typical preselected limit would be about 40 percent by weight to about 45 percent by weight. It is advantageous to maintain the water content at levels as described above for the amended organic materials. Remixing can be done by emptying the container, preferably dumping out the contents of the entire container, and adding a source of moisture to the composting mixture. The source of moisture can include additional organic material or water. The quantity of moistening material added can be calculated from the water content of the moistening material and the weight and water content of the composting mixture.

The carbon content can be adjusted to within preselected limits similarly to the water content. The carbon content of the composting mixture can be monitored during the composting process. Should the carbon content vary from the preselected limits, it can be adjusted by remixing. Typically, carbon content would be maintained within preselected limits for the carbon:nitrogen ratio of about 25:1 to about 35:1. The quantity of nitrogen-containing material to be added can be calculated as described for amending the organic material. Advantageous carbon:nitrogen ratios are also as described for the amended organic material.

Remixing is also useful to maintain the volume of the composting mixture in the sealable container. New organic material can be added to replace volume lost through the process. A well-recognized result of composting is a reduction in the volume of a composting mixture. Volume reductions of as much as 40% in two weeks of composting are typical. Volume reduction can occur by several mechanisms. For example, composting results in conversion of solid material into gases which are released from the composting mixture. In addition, during the composting process, gravity, settling and other processes result in filling of the air spaces and voids originally in the composting mixture. This reduces the volume and makes the composting mixture more dense.

Although volume reduction provides a smaller volume of composted organic material to handle after the composting process, volume reduction presents several disadvantages during the composting process. For example, filling the air spaces and voids in the composting mixture can hinder the flow of air through the composting mixture and reduce the benefits of aeration. This can lead to insufficient control of the temperature such that parts of the composting mixture are too hot for effective composting and degradation does not occur in those regions. In addition, uneven aeration can result in insufficient oxygen supply for microbial activity in some parts of the composting mixture. This again results in parts of the composting mixture that are not degrading to composted organic material.

Volume reduction has another undesirable effect as well. The container and other apparatus used for composting are a valuable capital asset. If the volume of the composting mixture in the container is significantly less than, say only 40% of, the volume of the container, there is a large amount of valuable equipment capacity that is not being used. Remixing the compostable material and substantially refilling the container provides more efficient use of capacity of the composting apparatus.

Remixing can have another more subtle effect on the composting mixture as well. Remixing can regulate the variety of microbes found in the composting mixture. It has been established that the types of microbes present in a composting mixture changes throughout the composting process. Different microbes have optimal activity under different conditions and at different stages of degradation of the organic material. For example, the chemical composition of the composting mixture will change throughout the composting process, which can provide different levels of compounds that are either nutrients, regulators, or toxins for different microbes. In addition, different microbes can have different activities under different levels of compaction of the composting mixture, at different temperatures, or with variation of other conditions in the mixture. Furthermore, the presence of certain microbes can suppress or increase the growth of other microbes.

Remixing in a controlled setting such as in a mixer external to the sealable container allows control of the rate of decomposition through introduction of inoculant best suited to a particular function. For example, such an inoculant can contain colonies or cultures of species of microbes best suited to a particular function. This can be accomplished by blending an effective amount of composted material from a previous batch into a subsequent batch of composting mixture. Such remixing results in the addition of a composting mixture to another composting mixture that has been incubated for a longer time. Such remixing can also result in mixing into the composting mixture another composting mixture that has been incubating for a shorter time. This type of remixing, which is possible in a batch composting process with controlled mixing, results in increased microbial activity and an even distribution of microbial activity throughout the composting mixture.

Remixing can be effective to control the mixture of microbes since remixing can include adding a defined and controlled inoculant, adding materials to change the composition of the composting mixture, or adding materials to change the bulk properties of the composting mixture. This allows control of the cycling of the microbes. Hence, monitoring the conditions of the composting mixture and remixing can allow optimization of the mix of microbes in the composting mixture to more effectively control the composting process.

SYSTEMS OF THE PRESENT INVENTION

The invention includes various systems designed for particular composting needs.

A first embodiment of a system according to the invention can be used in highly populated or urban areas, or other areas where space is limited. This system can be placed in small areas, for example at community nature centers or recycling stations. The area needed is generally about 3000 square feet per ton per day of processing capacity. This system generally includes at least one sealable container having a volume of approximately one cubic yard, an air management system to move air through the sealable container, and a dumping system, for example a stationary or mobile tipper. Any biofilter or curing bin should be approximately the same size as the sealable containers. Construction equipment known under the common name "Bobcat" are ideal for such transporting the container or biofilter in such a system.

A second embodiment is for larger areas, for example, municipal composting and recycling stations, waste handling stations, abandoned railroad yards, desert flats, and other such areas. The area generally needed is about 1 to about 20 acres. This system generally includes a plurality of sealable containers, typically about 4 to about 200 containers, each container generally having a volume from 20 to 80 cubic yards, preferably 40 cubic yards. The system can further include a biofilter and, optionally, at least one curing bin, each biofilter or curing bin preferably with a 20 cubic yard volume. Containers particularly suited for this embodiment include roll-off garbage, rubbish or construction containers. Typically, one end of the container has wheels thereon, thereby allowing the container to be easily moved if the opposite end is picked up. A transport system for this system can include equipment such as a roll-off truck with a winch, a larger fork truck or front-end loader, or other vehicles capable of lifting and dumping the sealable containers. A dumping system for this system can includes a mobile or stationary tipper.

A third embodiment is designed for extensive areas, typically about 10 to about 1000 acres. Such areas include abandoned railroad yards and ports. This system generally includes between about 40 to about 2000 sealable containers, at least one biofilter and, optionally, a plurality of curing bins. The sealable containers, biofilter, and curing bins are preferably intermodal containers. Intermodal containers are stackable and are designed to be transported by truck, railroad, or on large ocean going vessels and typically have a volume from about 40 to 120 cubic yards, preferably 80 cubic yards. These intermodal containers are generally moved by a large overhead crane or oversize wheel loader and can be dumped by a stationary or mobile tipper.

Although three specific embodiments of systems have been provided, other sized containers and dumping systems can be designed to provide a system suited for a particular location and composting need.

The preceding detailed description is intended to disclose full and detailed operating parameters for the invention. The invention has been described with reference to various specific and preferred embodiments. However, it should be understood that many variations and modifications may be made while remaining within the spirit and scope of the invention. Those of skill in the art will immediately see from the foregoing the broad scope of the invention as defined in the following claims.

I claim:

1. A method for composting organic material comprising the steps of:
   (a) establishing incubation limits for said composting that are compatible with said composting of said organic material;
   (a) placing compostable material in a sealable container and transporting the sealable container to a site remote from a mixing station;
   (b) incubating the compostable material at a temperature, moisture content, and for a time to at least partially decompose the compostable material to a composted material, the incubating comprising monitoring the temperature and moisture content, and adjusting the temperature and moisture content in the compostable material;
   (d) monitoring said incubating compostable material to determine if said incubation limits are exceeded;
   (c) transporting the sealable container to the remote mixing station and removing said incubating compostable material from the container responsive to said incubation limits being exceeded;
   (d) mixing said incubating compostable material with additional compostable material to amend said incubating compostable material and placing the mixture in the sealable container; and
   (e) incubating the mixture at a temperature and for a time to decompose the mixture to composted material.

2. The method according to claim 1, where the adjusting of the temperature and moisture content is accomplished by aerating the compostable material.

3. The method according to claim 1, further including removing the composted material from the container and placing in a curing bin.

4. The method according to claim 1, wherein the sealable container has a capacity of about 1 cubic yard.

5. The method according to claim 4, further comprising transporting the sealable container with a fork truck or pallet jack.

6. The method according to claim 1, wherein removing is accomplished with a stationary or mobile tipper.

7. The method according to claim 1, wherein the sealable container has a capacity of about 40 cubic yards.

8. The method according to claim 7, further comprising transporting the sealable container with a roll-off truck or mobile tipper.

9. The method according to claim 7, wherein the removing is accomplished with a stationary or mobile tipper.

10. The method according to claim 7, wherein sealable container is a roll-off rubbish container.

11. The method according to claim 7, wherein the sealable container is an intermodal container.

12. The method according to claim 1, wherein the sealable container has a capacity of about 80 cubic yards.

13. The method according to claim 12, further comprising transporting the sealable container with a crane or oversize wheel loader.

14. The method according to claim 12, wherein the dumping is accomplished with a stationary or mobile tipper.

15. The method according to claim 12, wherein the sealable container is an intermodal container.

16. The method according to claim 2, wherein said step of aerating further comprises biofiltration of air exhausted during said aerating.

17. The method according to claim 16, wherein the biofilter is dumped at a mixing station remote from the site at which it biofilters prior to adding additional porous organic material.

* * * * *